United States Patent
Queralto Bonell

(10) Patent No.: US 7,277,154 B2
(45) Date of Patent: Oct. 2, 2007

(54) VERTICAL PLATTER SYSTEM FOR DIVIDING A 35 MM CINEMATOGRAPHIC FILM AND INCREASING THE NUMBER OF STARTING TIMES OF THE FILM IN SEVERAL THEATRES IN A MULTIPLEX CINEMA WITH A SINGLE COPY DESCRIPTION

(75) Inventor: Josep Maria Queralto Bonell, Barcelona (ES)

(73) Assignee: Tecnoprojet, S.L., Barcelona (ES)

( * ) Notice: Subject to any disclaimer, the term of this patent is extended or adjusted under 35 U.S.C. 154(b) by 290 days.

(21) Appl. No.: 11/170,736

(22) Filed: Jun. 28, 2005

(65) Prior Publication Data

US 2006/0086859 A1    Apr. 27, 2006

(30) Foreign Application Priority Data

Jun. 30, 2004    (ES) ............................... 200401580

(51) Int. Cl.
G03B 21/32    (2006.01)
G03C 11/00    (2006.01)

(52) U.S. Cl. ....................................... 352/130; 352/40
(58) Field of Classification Search .............. 352/40, 352/126, 127, 128, 130
See application file for complete search history.

(56) References Cited

U.S. PATENT DOCUMENTS

| | | | | |
|---|---|---|---|---|
| 3,823,890 A | * | 7/1974 | Potts ......................... | 242/328.2 |
| 4,089,490 A | * | 5/1978 | Quintanar et al. ........ | 242/334.6 |
| 4,169,566 A | * | 10/1979 | Boudouris et al. ........ | 242/328.2 |
| 5,820,061 A | * | 10/1998 | Stewart .................... | 242/421.8 |

* cited by examiner

*Primary Examiner*—Rodney Fuller
(74) *Attorney, Agent, or Firm*—Darby & Darby

(57) ABSTRACT

This system comprises vertical platter devices (4) including a support tower (43), vertical platters (41, 42) with as many removable rings (5) for winding the film projected in the corresponding theatre, a sprocket (46) for eventual pulling of the film (3), free-turning rollers (47) for guiding the film (3), a tension roller (6) and push buttons (9) to control the operation of the vertical platters (41,42) and the sprocket (46). The system further includes auxiliary devices (7) for cutting and/or splicing the film (3).

4 Claims, 7 Drawing Sheets

VERTICAL PLATTER SYSTEM FOR DIVIDING A 35 MM CINEMATOGRAPHIC FILM AND INCREASING THE NUMBER OF STARTING TIMES OF THE FILM IN SEVERAL THEATRES IN A MULTIPLEX CINEMA WITH A SINGLE COPY DESCRIPTION

OBJECT OF THE INVENTION

The present invention refers to a vertical platter system which, with a single 35 mm film copy and with existing feature film non-rewinding horizontal platter systems, allows projecting the film without interruption in several theatres of a multiplex cinema in a multi-schedule composition, so that several sessions can be started within the running time of the film.

BACKGROUND OF THE INVENTION 35 mm wide films are usually projected in multiplex cinemas with several theatres.

Each one of these theatres has a single film projector projecting the entire film without interruption, the latter being stored in a feature-film device called a non-rewinding horizontal platter system.

The 35 mm film or copy is spiral wound on a horizontal platter such that the beginning of the film is inside the spiral and the end is on the outside thereof. With this configuration on the horizontal feed platter, the film comes out from the centre of the spiral and, with its own motorised feed regulator system, the horizontal feed platter feeds the 35 mm film which is thread onto a second horizontal platter provided with a ring in which all the film is spiral wound until the end, such that when the session is finished the central film-bearing ring is removed and placed again on the horizontal feed platter for a new projection performing the aforementioned steps.

When performing the spooling or winding of the film as it is displayed, the end of the film corresponding to the beginning is always arranged in the central or inner area of the reel; therefore this feature film system is usually called a non-rewinding horizontal platter system.

With this system a different film or title is normally projected in each one of the theatres of the multiplex cinema.

Frequently and especially in the case of those films with high spectator demand it is convenient to project the same film or title in two or three theatres. This operation is currently performed in two different manners described below.

In a first process, called synchronous, a single film is used, simultaneously projecting it in several theatres and using to this end contiguous or adjacent theatres. In order to do this the film is placed on the horizontal feed platter of the projector in said first theatre, threading and projecting this single copy on the projector of said first theatre. When exiting this projector the film is then guided by means of rollers to the projector in the second theatre, passing through the projector responsible for projecting the film in this second theatre.

When exiting this projector, the film is then guided by means of rollers towards the projector in the third theatre, where the entire film is also continuously projected.

Therefore, with this process continuous film projection is performed in the three adjacent theatres, starting the film in the three rooms with a minimum time difference, which may range between 30 and 60 seconds, depending on the distance the film must cover between the adjacent rooms.

This process therefore allows projecting the same film practically simultaneously in three theatres, thereby increasing the number of viewers that may watch it in the same schedule or session; however, it has the drawback that another multiple projection may not start until the previous session has finished because the film is still in use.

This system therefore allows increasing the number of viewers that can watch the film practically simultaneously, but does not allow to offering greater scheduling capacity.

Another process which is different to the previous one but also common, can be performed when the film distribution company provides a greater number of copies of the same title, three, for example.

In this case, the usual process is followed at a logistics level in each theatre, that is, each projector with its own feature film systems. However, in this case a much more profitable and commercial offer can be provided, regarding scheduling, with respect to the previous process, since the projection of each theatre, being independent, may be started with a time difference approximately equal to a third part of the total film duration. This greater scheduling offer allows the viewer to choose between a greater number of starting times and, when arriving at the multiplex cinema, to have a smaller waiting time until the next session begins than in the previous case.

Therefore, the technical problem set forth is to develop a system for continuous film projection of a single film in several multiplex cinema theatres having the advantages of the two previously mentioned systems, that is, that by means of using a single film or copy the entire film may be continuously projected in several theatres, having film sessions or projections in said theatres at different times, starting the session in any one of the theatres when the same film is still being displayed in another theatre.

DESCRIPTION OF THE INVENTION

The vertical platter system object of the invention is applicable in those multiplex cinema theatres of the type described, that is, those in which each theatre has a film projector and a non-rewinding horizontal platter system.

According to the invention the system comprises, in each theatre, a vertical platter device and an auxiliary device for cutting and/or splicing the film.

The vertical platter device comprises an essentially vertical support tower, the front of which has a slight inclination backwards in its vertical direction.

Assembled on said supporting tower are two vertical platters driven by means of independent motors and provided with as many removable rings, similar to those used in horizontal platter systems, and intended for receiving the film coming from the projector of one of the theatres, as will be explained below. The removable rings are fixed on vertical platters by means of a removable arm and a tightening nut, said rings rotating along with their respective vertical platters.

Also assembled on said tower of the vertical platter device are a sprocket selectively driven by a motor and which allows feeding the film coming from the theatre projector, free-turning rollers to guide the received film towards one of the vertical platters, a tension roller to compensate film tension at the beginning of the session and a control circuit provided with push buttons for selective actuation of the vertical platters and the feed sprocket.

Said free-turning tension roller is associated with a support assembled with longitudinal shifting capability on a guiding rod or bar, a spring acting upon said support tending to shift the tension roller towards one of the ends of the guiding bar.

The auxiliary device for cutting and/or splicing the film comprises a work-bench on which a conventional film cutting/splicing machine can be placed in order to comfortably perform cutting or splicing operations and a receptacle to collect the film during the time needed to perform these operations on a film section coming from the corresponding theatre projector.

In order to conveniently use this system and be able to continuously project a single film or copy in different multiplex cinema theatres with different projection or session schedules, it is necessary that the film has been previously cut in a number of portions at least equal to the number of theatres in which it will be projected, the successive film portions being initially spliced by means of adhesive tape or another similar removable element.

The configuration of the described system allows performing the continuous projection of a single film in several theatres of multiplex cinema theatres following a certain process. This process is explained below for a total of two theatres in order for it to be more understandable, although it could be used following the same process for a greater number of theatres.

The spool or reel of the film to be projected is initially placed on one of the platters of the non-rewinding horizontal platter system of the first theatre, such that the beginning of the film is in the central or inner area of the reel, as is usual, passing the end corresponding to the start of the film through the projector of the first theatre and the guiding rollers of the vertical platter device, and then fixing it with the first platter of the vertical platter device of said first theatre.

Once this operation has been performed continuous film projection begins in the first theatre and the film is wound on the first vertical platter of the vertical platter device of the first theatre.

When the first portion of the film has been projected in the first theatre and the adhesive tape joining it to the second portion of the film passes through the feed sprocket of the vertical platter device, the vertical device push button stopping the vertical platter being used is pushed and the feed sprocket is actuated, accumulating an initial section of said second portion of the film in the auxiliary table receptacle, while said second portion is still continuously displayed in the first theatre. Accumulation of the film in said receptacle is performed during the time necessary to remove, on the auxiliary table, the adhesive tape joining the first and second portions of the film and assemble the starting end of the second film portion, passing through the feed sprocket, the rollers and the tension roller, on the second free vertical platter of the first theatre vertical platter device. Once these operations have been performed, one of the push buttons is actuated to start the operation of said second vertical platter and inhibit the operatoin of the feed sprocket, winding the second portion of the film on the second platter of the vertical platter system while it is still being projected in said first theatre.

The first portion of the film, already displayed in the first theatre, is removed from the first platter of the vertical platter device and is placed on the first horizontal platter of the horizontal platter system of the second projection theatre, threading the end corresponding to the start of the film in the second theatre projector and then on the first vertical platter of the vertical platter device of the second projection theatre, starting the projection of said first portion of the film in the second theatre.

In order to display the entire film in the second theatre it is necessary that the duration of the first and second portion of the film have been conveniently calculated so that projection of the second portion of the film in the first theatre ends before projection of the first portion in the second theatre.

With this requirement, once film projection has ended in the first theatre, the second portion of the film is removed from the vertical platter device of the first theatre and placed on the free platter of the horizontal platter system of the second projection theatre, splicing the end of the first portion with the beginning of the second portion by means of adhesive tape, using the splicing table, before projection of the first portion of the film has ended in this second theatre.

Continuous projection of a single film is thus achieved in the two theatres, with a time difference approximately equal to half the duration of the film and the final winding of the entire film on one of the platters of the vertical platter device of the second theatre, leaving the film ready for a new projection by repeating the aforementioned process.

DESCRIPTION OF THE DRAWINGS

In order to complement the description being made and with the object of aiding comprehension of the features of the invention, a set of drawings is attached to the present specification in which the following has been represented in an illustrative and non-limiting manner.

PREFERRED EMBODIMENT OF THE INVENTION

Figure 2:
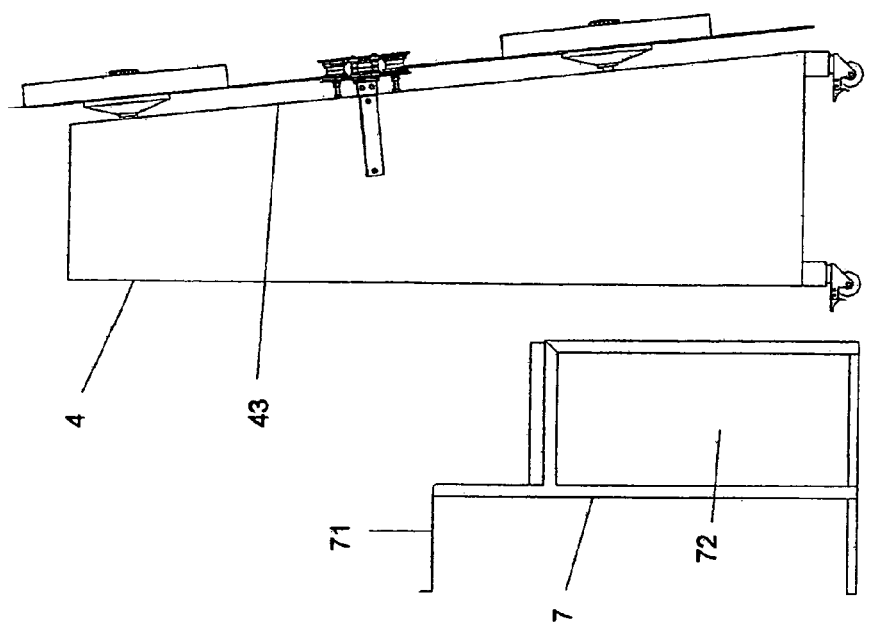
FIG. 2 shows a profile view of the elements shown in the previous figure.
Figure 1:
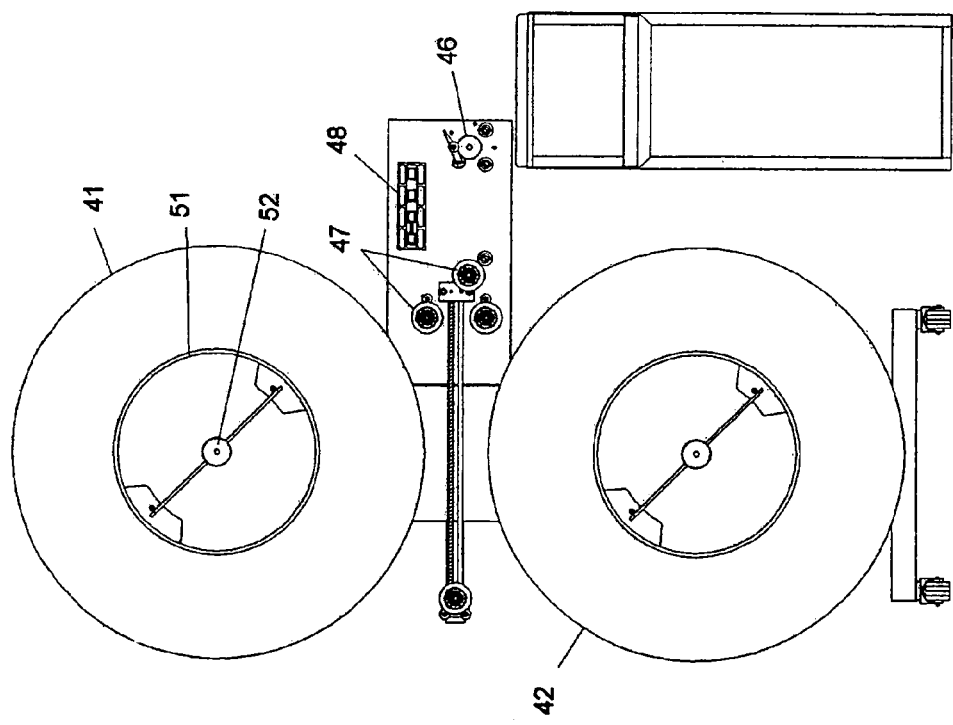
FIG. 1 shows an elevational view of an embodiment example of the system object of the invention in which the vertical platter device and the auxiliary splicing and/or separating device for the successive portions of the film can be seen.
Figure 3:
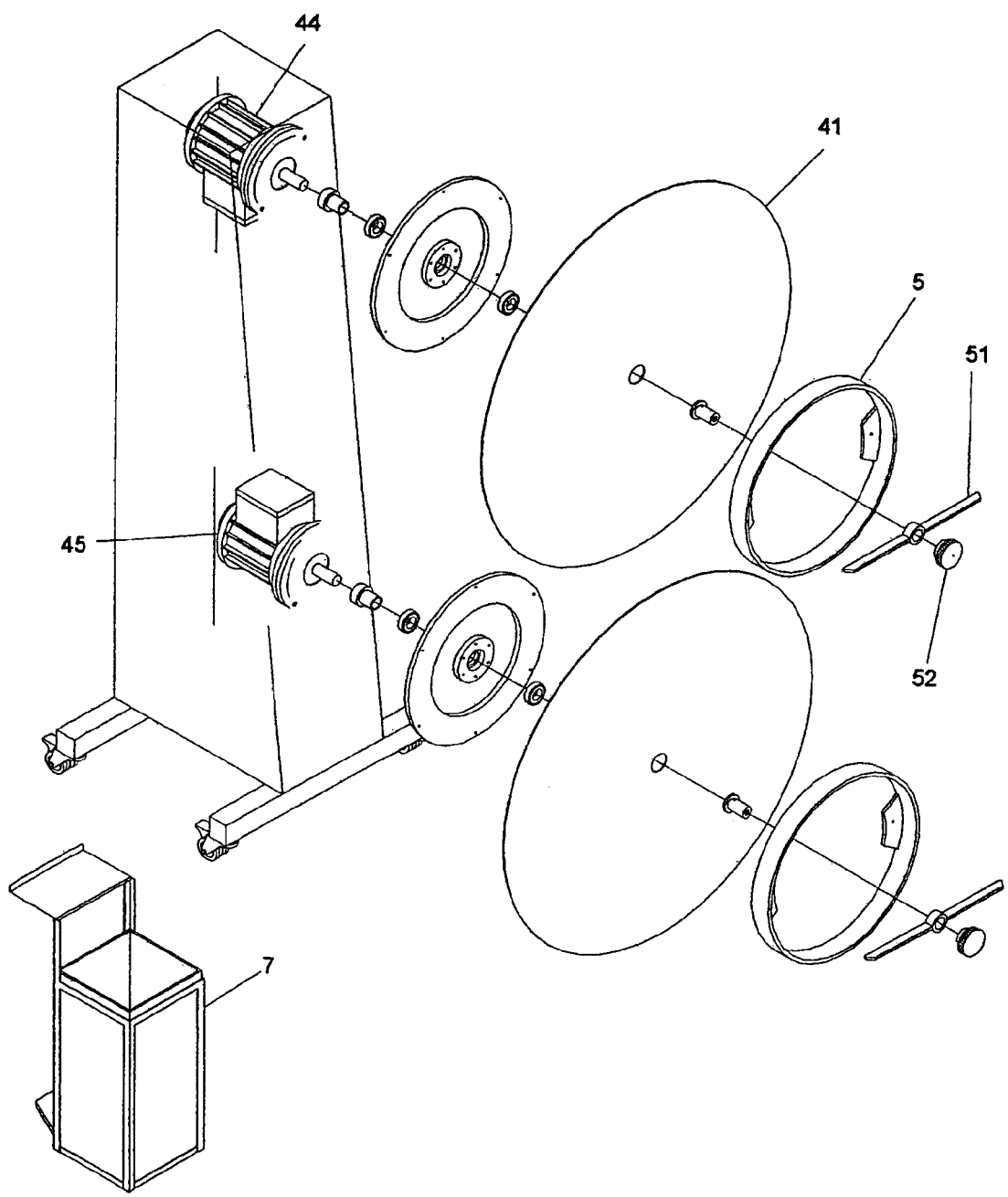
FIG. 3 shows an exploded perspective view of the vertical platter device and the auxiliary splicing device.
Figure 4:
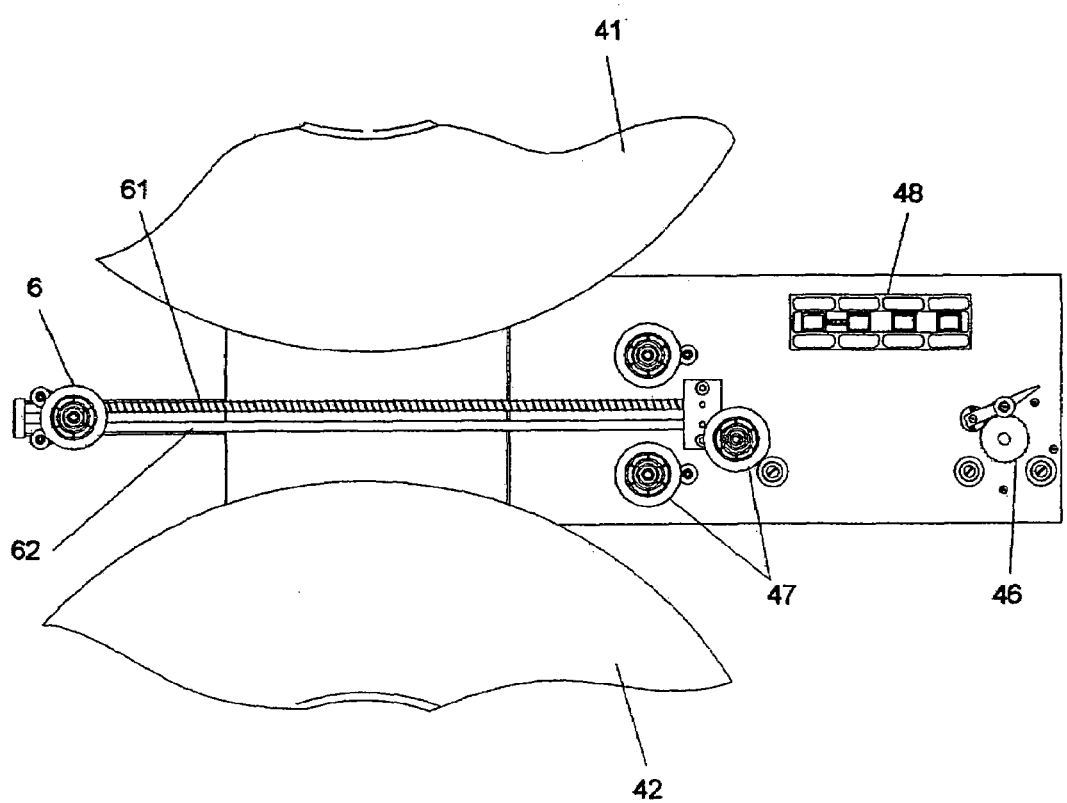
FIG. 4 shows an enlarged front elevational view of the film guiding and feeding means existing in the vertical platter device.

As mentioned above, this system is applicable to those multiplex cinema theatres having in each theatre a film projector (1) and a conventional system (2) of horizontal platters (21, 22) for placing the film (3) to be projected.

The vertical platter device (4) to be installed in each projection theatre comprises a support tower (43) on which two vertical platters (41, 42) are assembled that can be actuated by means of independent motors (44, 45) and provided with as many removable rings (5) similar to those used in the conventional systems (2) of horizontal platters. Said removable rings (5) are fixed to the respective platters (41, 42) by means of an arm (51) and a tightening nut (52).

In order to guide and optionally feed the film (3) coming from a projector towards one of the vertical platters (41, 42), the vertical platter device has a motorised sprocket (46), free-turning rollers (47) and a tension element comprising a roller (6) assembled by means of a support and with longitudinal shifting capability on a guiding rod (61) and a spring (62) tending to shift said roller (6) towards one of the ends of said guiding rod (61), applying tension to the film resting on said roller (6).

Actuation of the vertical platters (42, 46) and the feed sprocket (46) is controlled by means of the push buttons (48).

The auxiliary device (7) intended for being positioned in each projection theatre for comfortable cutting and/or splicing of the successive portions (31, 32) of the film to be projected has a work-bench (71) and a receptacle (72) for momentary accumulation of one of the ends of the portions (31, 32) of the film (3) during the cutting and/or splicing operations.

Figure 5:
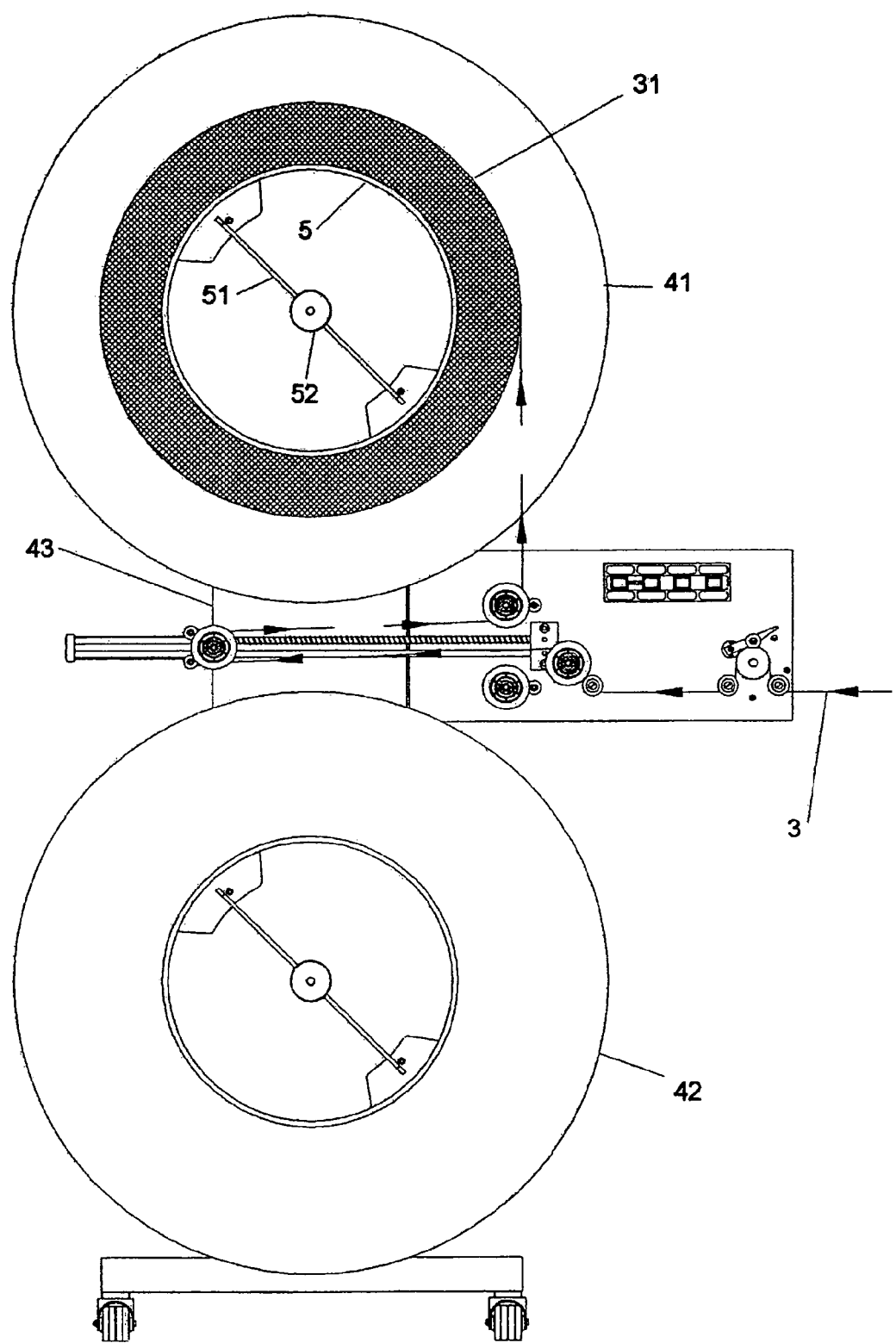
FIG. 5 shows a front elevational view of the vertical platter device during reception of the first portion of the film coming from one of the projectors.
Figure 6:
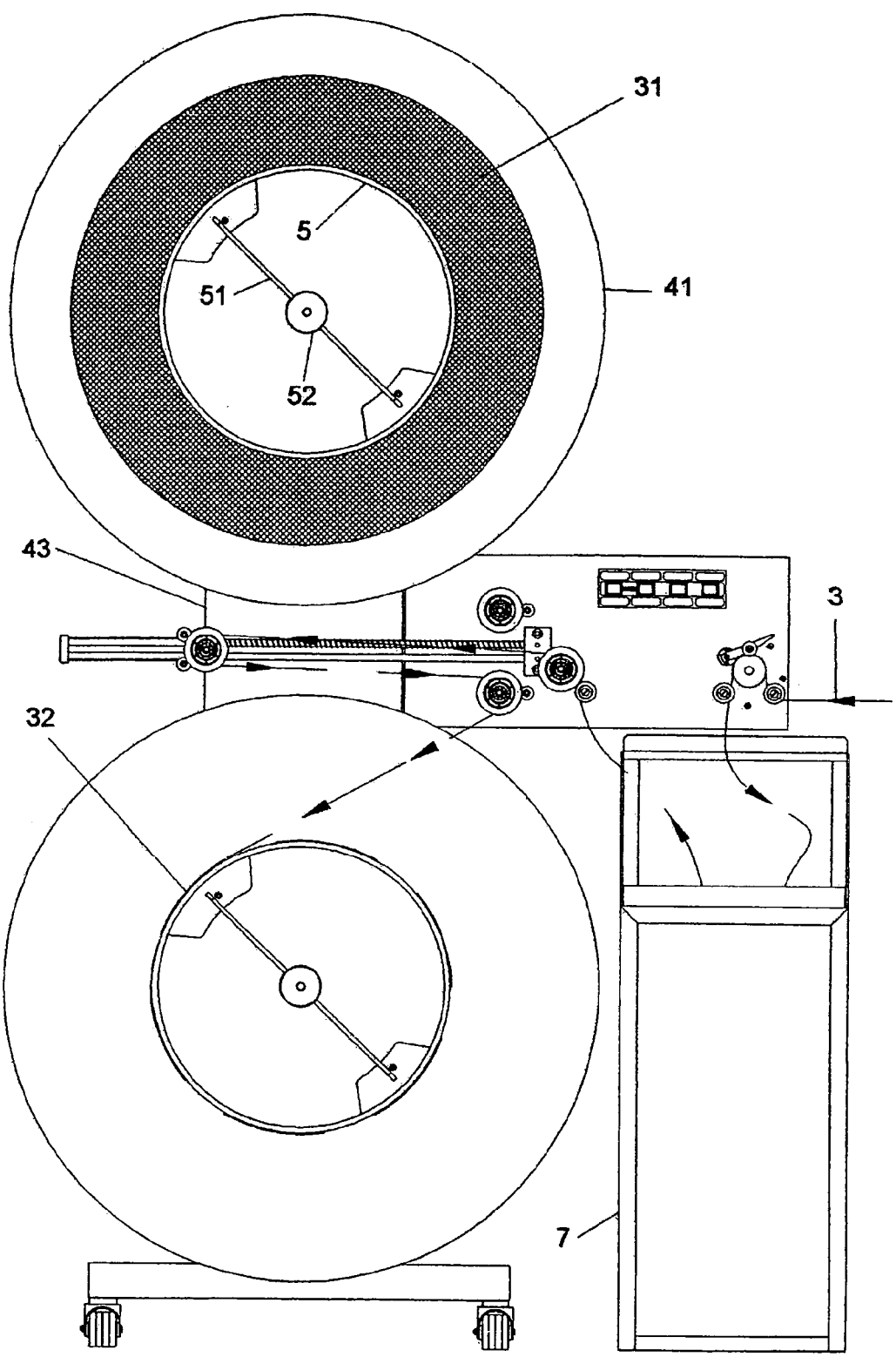
FIG. 6 shows a similar view to the previous one during the initial winding of the second film portion coming from a projector onto the second vertical platter, after having separated it from the first portion of the film, which is wound upon the first vertical platter.
Figure 7:
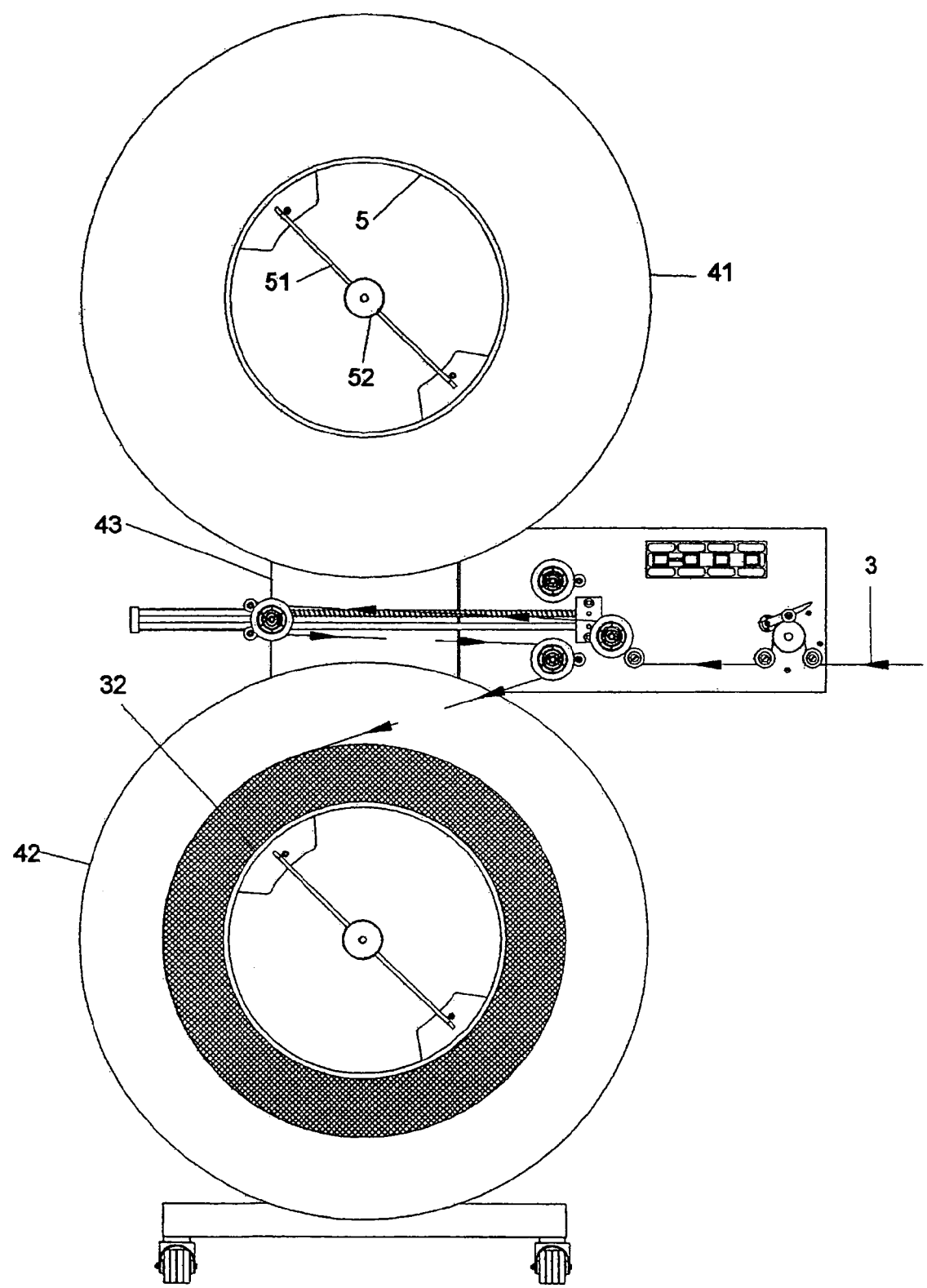
FIG. 7 shows a similar view to the previous one after having removed the first portion of the film from the first vertical platter to place it on one of the platters of the horizontal platter system of the second projection theatre.
Figure 8:
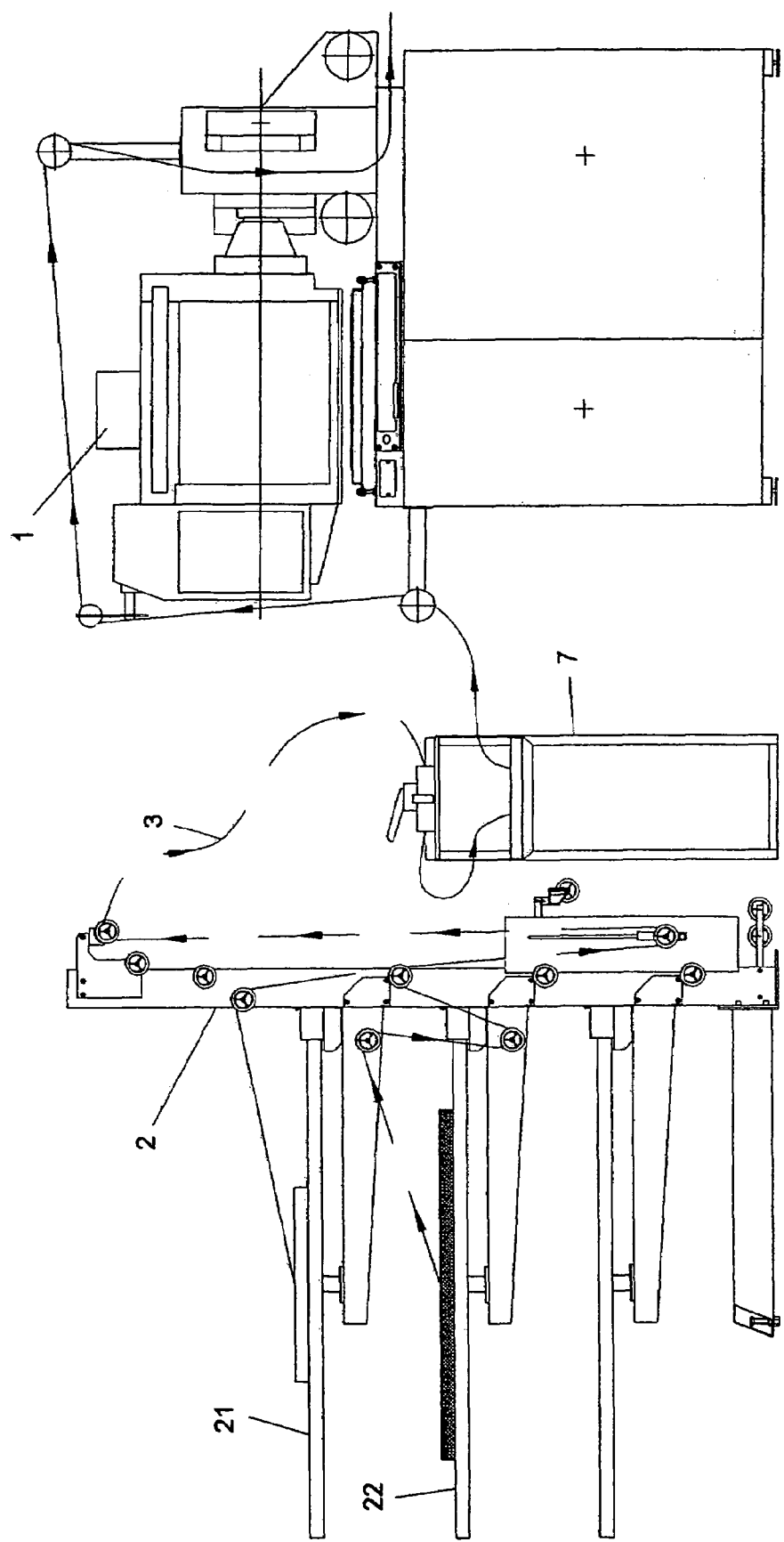
FIG. 8 shows, as an example, a profile view of the horizontal platter system and the projector of a second projection theatre and a frontal view of the auxiliary device used for splicing the two portions of the film by means of adhesive tape, after having been projected consecutively and without interruption in a first projection theatre.

As has been mentioned above and as can be seen in FIGS. 5, 6 and 7, as the first portion (31) of the film is being displayed in the first projection theatre, it is collected on the first platter (41) of the vertical platter device (4) while it is being displayed. When the first portion (31) has been displayed in the first theatre and the joining adhesive tape has passed the feed sprocket (46), one of the push buttons (8) is pressed causing the platter (41) to stop and the sprocket (46) to be actuated, the latter being responsible for feeding an initial section of the second portion (32) of the film towards the inside of the receptacle (72), performing this operation during the time necessary for the projectionist to separate the ends of the two portions (31, 32) of the film and perform the coupling of the second section (32) with the second vertical platter (42), passing it by the guiding rollers (47) and the tension roller (6), after which a suitable push button is actuated so that the second platter (42) starts operating and the feed sprocket (46) is stopped.

The first portion (31) of the film is removed from the vertical platter (41) and placed on the feed platter (21) of the horizontal platter system of the second projection theatre, subsequently being collected on the vertical platter (41) corresponding to the vertical platter device of this second projection theatre.

When the second portion (32) of the film has been completely displayed in the first theatre, it is removed from the vertical platter (42) of the first theatre and placed on the second platter (22) of the horizontal platter system of the second theatre (FIG. 6), the splicing of the end of the first portion (31) with the beginning of the second portion (32) being performed so that the film will also be projected continuously and without interruption in this second projection theatre.

Having sufficiently described the nature of the invention as well as a preferred embodiment thereof, it is here stated that the elements described can be modified as long as this does not mean an alteration of the essential features of the invention claimed below.

The invention claimed is:

1. A vertical platter system for dividing a 35 mm cinematographic film and increasing the number of starting times for the film in various multiplex cinema theatres with a single copy; each one of the theatres being provided with a film projector (1) and a system (2) of horizontal platters (21, 22) without rewinding; wherein it comprises in each projection theatre:

a vertical platter device (4) made up of a support tower (43) on which vertical platters (41, 42) are assembled that can be selectively actuated by means of respective independent motors (44, 45), said vertical platters (41, 42) being provided with as many removable rings (5), similar to those used in the systems (2) of horizontal platters, in order to perform on two different platters (41, 42) or on a single vertical platter (41) the successive portions (31, 32) of the film (3) immediately after having been projected in the corresponding theatre; said vertical platter device (4) further comprising: a motorised sprocket (46) for eventual feeding of an initial section of the second portion (32) of film, in the case that the latter is separated from the initial portion (31) and subsequently collected on a vertical platter (42) different to that used for collecting or winding the first portion (31) of the film, free-turning rollers (47) to guide the film (3) towards one of the vertical platters (41, 42), a tension roller (6) to compensate the tension of the film (3) at the beginning of the session and push buttons (8) to selectively control the operation of the vertical platters (41, 42) and the sprocket (46) and, an auxiliary device (7) for cutting and/or splicing the film (3), said auxiliary device (7) comprising a work-bench (71) for the optional placing of a conventional film cutting/splicing machine and a receptacle (72) for collecting an initial section of the second portion (31) of the film in case this is going to be separated from the initial portion (31) and subsequently collected on a vertical platter (42) different to that used for collecting or winding the first portion (31).

2. A system according to claim 1, wherein the support tower (43) is essentially vertical, its front having a slight inclination backwards in its vertical direction to assure the stability of the reel or reels of film (3) formed on any of the vertical platters (41, 42).

3. A system according to claim 1, wherein the tension roller (6) is free-turning and assembled by means of a support and with longitudinal shifting capability on a rod (61) tending to stay at one of the ends of said rod (61) due to the action of a spring (62).

4. A system according to claim 1, wherein the removable rings (5) are fixed on the platters (41, 42) by means of an arm (51) and a tightening nut (52).

* * * * *